(12) United States Patent
Smith-Casem et al.

(10) Patent No.: US 9,460,538 B2
(45) Date of Patent: Oct. 4, 2016

(54) ANIMATION FOR CONVEYING SPATIAL RELATIONSHIPS IN MULTI-PLANAR RECONSTRUCTION

(71) Applicants: Mervin Mencias Smith-Casem, Renton, WA (US); Bruce A. McDermott, Bellevue, WA (US)

(72) Inventors: Mervin Mencias Smith-Casem, Renton, WA (US); Bruce A. McDermott, Bellevue, WA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 285 days.

(21) Appl. No.: 13/961,814

(22) Filed: Aug. 7, 2013

(65) Prior Publication Data

US 2015/0042657 A1 Feb. 12, 2015

(51) Int. Cl.
*G06T 19/00* (2011.01)
*G06T 13/20* (2011.01)
*G06T 15/08* (2011.01)

(52) U.S. Cl.
CPC ............. *G06T 13/20* (2013.01); *G06T 15/08* (2013.01); *G06T 19/00* (2013.01); *G06T 2210/41* (2013.01); *G06T 2219/008* (2013.01)

(58) Field of Classification Search
None
See application file for complete search history.

(56) References Cited

U.S. PATENT DOCUMENTS

| | | | |
|---|---|---|---|
| 7,864,327 B1 | 1/2011 | Chen | |
| 2006/0093199 A1* | 5/2006 | Fram et al. | 382/128 |
| 2007/0016025 A1* | 1/2007 | Arenson et al. | 600/437 |
| 2007/0116357 A1* | 5/2007 | Dewaele | G06K 9/3233 382/173 |
| 2007/0237369 A1* | 10/2007 | Brunner et al. | 382/128 |
| 2009/0074280 A1* | 3/2009 | Lu | A61B 8/00 382/131 |
| 2009/0304250 A1 | 12/2009 | McDermott et al. | |
| 2011/0317899 A1* | 12/2011 | Stockhausen | G06T 15/08 382/131 |
| 2012/0081362 A1* | 4/2012 | Kiraly et al. | 345/419 |
| 2012/0323547 A1* | 12/2012 | Baloch et al. | 703/11 |

FOREIGN PATENT DOCUMENTS

EP 2 341 836 A1 7/2011

OTHER PUBLICATIONS

Echocardiography, "Echo in a Heartbeat," Medical Solutions, webpages, www.siemens.com/healthcare-magazine, pp. 32-37, May 2009.

* cited by examiner

*Primary Examiner* — Andrew G Yang

(57) ABSTRACT

Spatial relationships are conveyed in multi-planar reconstruction (MPR). A 3D MPR display indicates relative position of MPR imaging planes to each other and/or anatomy at a given time. To better assist user understanding of the location of the MPR planes relative to each other and/or anatomy in transitioning to different relative locations, the transition is animated. The shift in planar position occurs gradually in the 3D MPR display despite user indication of a jump to another arrangement.

20 Claims, 2 Drawing Sheets

ANIMATION FOR CONVEYING SPATIAL RELATIONSHIPS IN MULTI-PLANAR RECONSTRUCTION

BACKGROUND

The present embodiments relate to medical diagnostic imaging. In particular, multi-planar reconstructions of a volume representing a patient are shown.

Ultrasound or other medical imaging modalities may be used to scan a patient. For example, echocardiography is a commonly used imaging modality to visualize the structure of the heart with a multi-planar reconstruction (MPR). MPR shows images of specific planes through a 3-dimensional volume. Because the echo is often a 2D projection of the 3D human heart, standard views are captured to better visualize the cardiac structures. For example, in the apical four-chamber (A4C) view, all four cavities, namely left and right ventricles, and left and right atria, are present. In the apical two-chamber (A2C) view, only the left ventricle and the left atrium are present. Another example is imaging the intracranial structures of a fetus. Three standard planes are acquired with different orientations for visualization of the cerebellum, the cisterna magna, and lateral ventricles. The user may adjust the planar positions of the MPR to be different from the standard views or to locate the standard views.

Users, especially novice users, often have a difficult time understanding the relative orientations and positions of MPR images. Improving user understanding of MPR images is important because users are usually more comfortable with the 2D-like MPR images than with less-familiar looking volume rendered images. To assist in the understanding of the spatial relationships between MPR images, colored lines are displayed on each MPR image to show where the MPRs intersect one another. Another approach is to replace a volume rendered image with a three-dimensional (3D) MPR display in which the MPR images are rendered together in the relative orientations and positions. However, these approaches may not provide sufficient information, since the position relative to the patient is difficult to extrapolate. When switching from one MPR arrangement to another, the relative positions change. The jump between relative positions may further diminish the user's ability to understand the relative orientations and positions.

BRIEF SUMMARY

By way of introduction, the preferred embodiments described below include methods, computer-readable media and systems for conveying spatial relationships in multi-planar reconstruction. A 3D MPR display of multiple planes relative to each other or anatomy indicates relative position of MPR imaging planes at a given time. To better assist user understanding of the location of the planes relative to each other and/or anatomy in transitioning to different relative locations, the transition is animated. The shift in planar position occurs gradually in the 3D MPR display.

In a first aspect, a method is provided for conveying spatial relationships in multi-planar reconstruction. A three-dimensional representation of a first relative positioning of one or more planes of the multi-planar reconstruction is displayed. A trigger to transition from the first relative positioning to a second relative positioning of the one or more planes of the multi-planar reconstruction is received. The transition in the displayed three-dimensional representation is animated such that the one or more planes are shown in intermediary relative positioning during the animation. The intermediary relative positioning is different from the first and second relative positioning of the one or more planes of the multi-planar reconstruction.

In a second aspect, a system is provided for conveying spatial relationships in multi-planar reconstruction. A memory is operable to store data representing a volume of a patient. A processor is configured to generate the multi-planar reconstruction from data. The multi-planar reconstruction includes a first planar image of a first plane through the volume. A timer is configured to cause a first display representing the first plane overlapping in a first relative orientation and first relative translation with a reference, a second display representing the first plane in a second relative orientation and second relative translation with the reference, and a sequence of third displays representing the first plane overlapping, with the reference, in relative orientations and relative translations between the first and second relative orientations and relative translations. A display is configured to display the first, second, and third displays.

In a third aspect, a non-transitory computer readable storage medium has stored therein data representing instructions executable by a programmed processor for conveying spatial relationships in multi-planar reconstruction. The storage medium includes instructions for receiving user input indicating a change of one or more planes in the multi-planar reconstruction, and animating the change as a sequence of three-dimensional representations showing the orientation and position of the one or more planes of the multi-planar reconstruction with the one or more planes rotating, translating, or rotating and translating over the sequence of the three-dimensional representations.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND SPECIFIC EMBODIMENTS

A 3D MPR is useful in conveying the spatial relationships among the MPRs or planes of the MPR. The 3D MPR may be displayed in an orientation graphic-sized format alongside MPR and volume rendered images. The spatial relationships are further conveyed by animating the 3D MPR to show how an MPR target orientation and/or position is related to that of a starting orientation and/or position (e.g., a reference or the current orientation/position). Animating the 3D MPR helps users get a better understanding of the MPR orientations. For example, 3D transesophageal (TEE) users may benefit from seeing the transition from one standard TEE MPR view to another (e.g., mid-esophageal four-chamber to mid-esophageal two-chamber).

Figure 1:
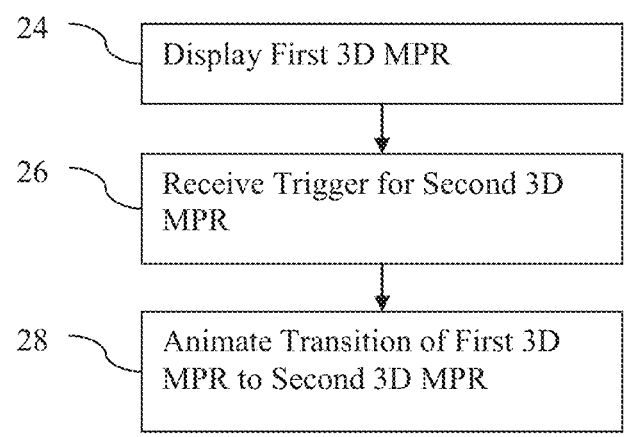
FIG. 1 is a flow chart diagram of an embodiment of a method for conveying spatial relationships in multi-planar reconstruction (MPR)

FIG. 1 shows a method for conveying spatial relationships in multi-planar reconstruction. The method is implemented by a medical diagnostic imaging system, a review station, a workstation, a computer, a PACS station, a server, combinations thereof, or other device for image processing medical ultrasound or other types of volume data. For example, the system 10 or computer readable media 14 and processor 12 shown in FIG. 4 implements the method, but other systems may be used. The method is implemented in the order shown or a different order. Additional, different, or fewer acts may be performed. For example, act 26 is optional. As another example, scanning is performed to acquire the data used for the display in act 24.

The acts 24-28 are performed in real-time, such as during scanning. The user may view images while scanning. The images may be associated with previous performance of acts 24-28 in the same imaging session, but with different volume data. For example, act 24 is performed for an initial scan. Acts 26 and 28 are performed for subsequent scans during the same imaging session. For real-time imaging, the volume data used for any given image may be replaced with more recently acquired data. For example, an initial volume rendering is performed with one set of data. The final rendering is performed with another set of data representing the same or similar (e.g., due to transducer or patient movement) volume. The animation may be for MPR images based on one or more sets of data. In alternative embodiments, a same data set is used for all of the acts 24-28, either in real-time with scanning or in a post scan review.

For scanning, an ultrasound transducer is positioned adjacent to, on, or within a patient. A volume scanning transducer is positioned, such as a mechanical wobbler, a TEE array, or multi-dimensional array. For adjacent to or on a patient, the transducer is positioned directly on the skin or acoustically coupled to the skin of the patient. For within the patient, an intraoperative, intercavity, cardiac catheter, transesophageal, or other transducer positionable within the patient is used to scan from within the patient.

The user may manually position the transducer, such as using a handheld probe or manipulating steering wires. Alternatively, a robotic or mechanical mechanism positions the transducer.

The volume region of the patient is scanned, such as scanning an entire heart or portion of the heart from the esophagus or through another acoustic window. Other organs or parts of a patient may be scanned. One or more objects, such as the heart, an organ, a vessel, fluid chamber, clot, lesion, muscle, and/or tissue are within the region. The wobbler or multi-dimensional array generates acoustic energy and receives responsive echoes. In alternative embodiments, a one-dimensional array is manually moved for scanning a volume.

One or more sets of data are obtained. The ultrasound data corresponds to a displayed image (e.g., detected and scan converted ultrasound data), beamformed data, detected data, and/or scan converted data. The ultrasound data represents a region of a patient. Data for multiple planar slices may represent the volume region. Alternatively, a volume scan is used. The region includes tissue, fluid or other structures. Different structures or types of structures react to the ultrasound differently. For example, heart muscle tissue moves, but slowly as compared to fluid. The temporal reaction may result in different velocity or flow data (e.g., color or Doppler velocity or energy). The shape of a structure or spatial aspect may be reflected in B-mode data. The ultrasound data is of any volume imaging mode. The data represents the region for which MPR imaging is performed.

In act 24, an initial three-dimensional MPR representation 36 (see FIG. 2) is displayed. Initial indicates a first representation relative to subsequent representations. The initial representation may or may not be the original representation displayed during a given imaging session or for a given volume.

The initial three-dimensional representation is of a first relative positioning of one or more planes of the multi-planar reconstruction (MPR). The three-dimensional MPR representation 36 shows relative positioning of planes or planar segments used for MPR. Where one or more planes are used in MPR, the relative position of the planes of the MPR may be shown in a single or combined representation.

Figure 2:
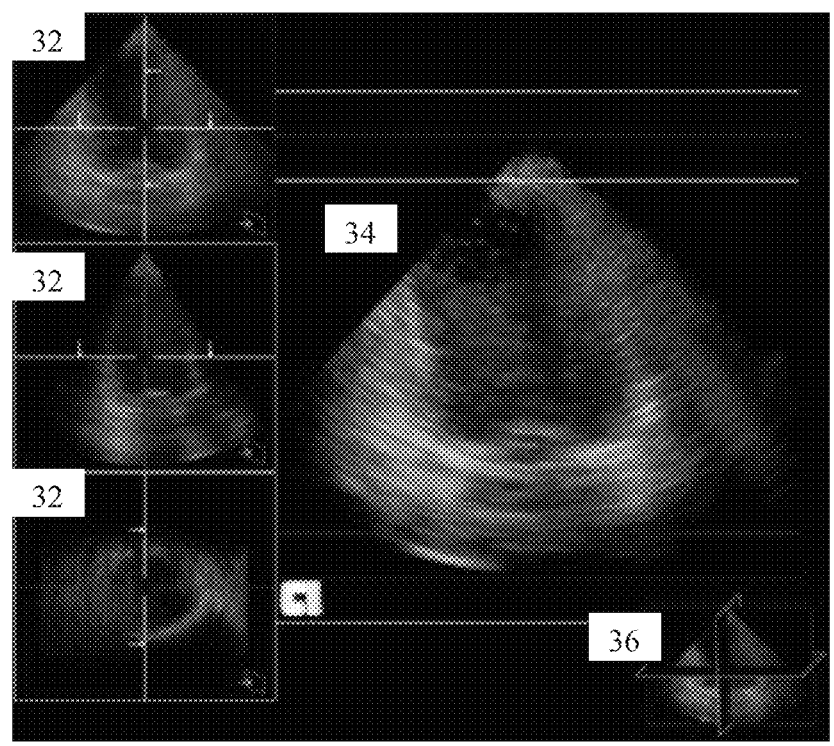
FIG. 2 is an example medical image showing MPR images with a volume rendered image and a 3D MPR representation.

The relative position of the planes to each other and/or the anatomy is represented in three-dimensions. The three-dimensional MPR representation 36 is three-dimensional since two non-parallel planes are represented. Rather than showing lines of intersection, a given representation shows the relative position of one or more planes from a perspective view. The one or more planes are shown as if viewed by a person rather than a line graphic being shown. The orientation and translation of the different planes to each other is shown. Due to the three-dimensional MPR representation 36, part of one plane may occlude another plane and also be occluded by that other plane. In the example of FIG. 2, each plane occludes at least part of the other planes given the view perspective. The user is shown a representation of the planes of the MPR are if viewed in the volume.

The amount or whether occlusion occurs may depend on the viewing angle and/or relative orientation of the planes of the MPR. If one plane is viewed orthogonally and the planes are orthogonal to each other, then the three-dimensional representation may appear to be one plane with two lines forming a plus. If viewed non-orthogonally and/or the planes are not orthogonal to each other, then portions of different planes may be occluded.

The relative position of the planes also determines what portion is occluded. In the example of FIG. 2, the planes are centered with respect to each other. In other embodiments, one or more of the planes are shifted or translated relative to each other, possibly along the x, y, and/or z axes.

The three-dimensional MPR representation 36 is formed by warping MPR images or image outlines to account for different spatial relationships given a viewing direction. In alternative embodiments, the volume data is masked or the MPR images are treated as a volume and the three-dimensional MPR representation 36 is rendered from the MPR image volume. Other approaches may be used.

The view direction of the three-dimensional MPR representation 36 is the same as a volume rendering view direction. Alternatively, other view directions are used, such as a predetermined or user selected view direction. In yet other embodiments, the view direction is based on the relative position of the transducer to the volume or based on anatomy of the patient.

In one embodiment, the three-dimensional MPR representation 36 is formed from wire frames or graphics representing the planar segments or planes. The wire frames are of any shape, such as square or rectangular. The wire frames may represent a screen or window border. In other embodiments, the wire frames represent an image border, such as being sector or Vector® shaped wire frames.

In another embodiment, the three-dimensional MPR representation 36 is formed from the MPR images 32 without additional graphics or wire frames. The images may be colored or otherwise altered so that one MPR image is distinguishable from another when shown as part of the three-dimensional MPR representation 36. Alternatively, the images without alteration other than for orientation and location relative to each other are used. The differences in image context indicates the border between the MPR images as displayed in an overlapping manner. In yet other embodiments, a combination of the MPR images and wire frames are used. The three-dimensional MPR representation 36 shows the frames with the MPR images included within the frames. Other approaches may be used to distinguish the MPR images 32 from each other as included in the single three-dimensional MPR representation 36.

The three-dimensional MPR representation 36 may include other information. In the example of FIG. 2, the three-dimensional MPR representation 36 is fused with a volume rendering. Wire frames representing the planes are overlaid on a volume rendered image. The volume rendered image is formed with one of the MPR planes as a clipping plane and the view plane orthogonal or close (e.g., within 10 degrees) to orthogonal to the clipping plane. As a result, the volume rendering appears to represent one of the multiple MPR planes. The viewing direction, clipping plane, and/or viewing plane for the volume rendering may be different from or not associated with a given MPR plane.

Since the volume rendering added to the three-dimensional MPR representation 36 may interfere with communicating spatial relationship, the fused volume rendering may fade over time, such as over one or more seconds. Alternatively, the volume rendering remains as part of the three-dimensional MPR representation 36.

As another example, labels are added to the three-dimensional MPR representation 36. One or more, such as all of the planes, may be identified. Any label may be used, such as numerical or textual labels. In one embodiment, the labels correspond to view names, such as A2C, A4C, and LAX. In another embodiment, the labels are colors, such as red for one frame, blue for another, and green for a third. Alternatively, no additional information is added.

The three-dimensional MPR representation 36 is displayed alone. For example, a majority or more of the screen includes the three-dimensional MPR representation 36. Given this sizing, the frames of the three-dimensional MPR representation 36 may include the MPR images 32 as well. The MPR images 32 are shown as normal sized images, but displayed together in the three-dimensional MPR representation 36. Separate MPR images 32 and/or volume rendering 34 are not shown at the same time.

In another embodiment, the three-dimensional MPR representation 36 is sized as an icon, graphic-sized format, or other size less than other simultaneously shown images. FIG. 2 shows one example where planar images 32 of the MPR extracted from a volume, a volume rendering 34 of the volume, and the three-dimensional MPR representation 36 are shown simultaneously.

The MPR is for one, two, three, or more planes. FIG. 2 shows three MPR images 32. The MPR images 32 are planar images for conceptual planes through the volume. The planes are through the scanned volume. Data along or adjacent to each plane is used to generate an MPR image 32. In the example of FIG. 2, the three MPR images 32 are for three planes orthogonal to each other with all three planes intersecting in a middle of each plane section. Each MPR image 32 includes a horizontal and vertical line showing the intersection of the other planes. These lines are added graphics rather than being three-dimensional representations.

FIG. 2 also shows a volume rendered image 34. Using surface, projection, or other volume rendering technique, the data representing the volume is rendered to an image. The image includes information from the entire volume or a non-planar portion of the volume. For example, the value of a given pixel is determined from multiple voxels along a line passing along a viewing direction through the pixel. Using comparison, a value of a surface (e.g., highest or first above a threshold) is selected. In another approach, alpha blending or other projection approach combines data along the line. In alternative embodiments, no volume rendered image 34 is provided.

In one embodiment, the three-dimensional representation of the volume (e.g., the volume rendered image 34) is for a standard diagnostic view. A rendering or clipping plane is parallel or substantially parallel (e.g., substantially accounts for an offset to view a valve or other internal structure) to a standard two-dimensional view. For example, the clip plane corresponds to an A4C view, an A2C view, a LAX, or other standard view and the viewing direction corresponds to an orthogonal to the clip plane with or without an offset. The displayed representation may be labeled (e.g., A4C) and/or annotated (e.g., valve highlighted). Similarly, the MPR images 32 may be for standard views.

The data used for the MPR images 32 and the volume rendered image 34 is from a given set. The data represents the patient at a given time. For images for other times, other sets of data are used, such as for real-time imaging. In other embodiments, a static or single set of data is used for images displayed at different times. The representation is static by having static MPR planes and/or static data. With either different data over time or different MPR planes over time, the images may vary over time. The three-dimensional MPR representation 36 may vary with changes in images or only vary due to changes in relative position of the planes.

The relative position of the planes is established in any manner. Any MPR approach may be used. For example, the user adjusts the position and/or orientation of one or more planes. The user may be seeking to locate a standard, preferred, or diagnostic view for one, more, or all of the planes. Different views are provided by the different planes. Using a click and drag or other user entry, a plane is translated and/or rotated to a desired position. The three-dimensional MPR representation 36 reflects these changes or is not activated until the user indicates that the desired planar positions are achieved.

In another approach, a processor or automatic detection of the planar positions is used. For example, anatomical features are detected. As another example, a machine-learned classifier locates the plane positions from the data representing the patient. Planes are positioned relative to the anatomy.

In yet another approach, the planar positions are established relative to the transducer. For example, the azimuth, elevation and range (depth) dimensions of the transducer define three orthogonal planes. Other orientations relative to the transducer may be used, such as one likely to provide standard heart images given a selected or assigned acoustic window used to scan the volume.

The relative position of the planes may be for user created positioning, standard positioning, default positioning, and/or reference positioning. For example, a reference position may be relative to the transducer, likely recognized by the user, or arbitrary. Standard positioning corresponds to providing standard views, such as A2C, A4C, and LAX views. Default positioning is an initial, predetermined, or set position, which may be a reference or standard position, but may not be. The default may be a user selected preference positioning.

In act 26, a trigger to transition from the one relative positioning to another relative positioning is received. In response to a processor or user input, a signal is generated and received. The signal indicates selection of relative positioning. The signal may indicate selection of a next arrangement of the planes of the MPR. A single input, such as operating a single button or clicking on an icon, may trigger transition. Multiple inputs may be used in other embodiments. The trigger may be received free of user input, such as an amount of time passing from a user set or processor determined event.

In one embodiment, the trigger is user selection of a default, standard, reference, or other spatial arrangement. The transition is from a current arrangement to another selectable arrangement (e.g., standard or default arrangement). Rather than the user using three-dimensional view direction or clipping plane type interaction with one or more of the planes, the user indicates the different arrangement non-spatially. The selection may be of an icon, a menu selection, or other user input. For example, the user selects one of various options from a drop down menu. The options may include one or more standard view arrangements, one or more default arrangements, one or more reference arrangements and/or one or more user created arrangements. The currently displayed arrangement is different from one of these arrangements selected from the list. Using the list, the arrangement is selected without user manipulation of the plane locations from the current arrangement to the selected arrangement.

In another example, the user manipulates one or more of the planes and stores the arrangement as a default or reference arrangement. The user further manipulates one or more planes to another arrangement. The trigger may be to transition back to the previous arrangement or to transition between user identified arrangements.

The trigger is to transition between different relative positions of one or more planes of the MPR. One or more planes are moved (e.g., translated and/or rotated). As a result, the relative position of the planes to each other changes. One or more planes of the MPR provides a spatial reference for the one or more other planes. The reference represents anatomy of the patient to provide spatial context to the user. Other references, such as a 3D rendering, may be used. The reference may be space, such as showing the plane on a uniform background. As a result, the relative position of one or more of the planes to patient anatomy changes. The transition results in re-orientation and/or re-positioning, such as orientation reset, up/down/right flips, or other relative shift.

Since the transition is to a pre-determined arrangement from a current arrangement, a jump would occur if merely switching between the two arrangements. The three-dimensional MPR representation 36 would seemingly instantaneously change from showing the planes in one relative positioning to another regardless of the amount of change. This may be confusing to the user.

To better represent spatial relationship between arrangements, allowing the user to maintain understanding of the spatial relationship between planes, the transition is animated in act 28. In response to the trigger, the transition is animated in the displayed three-dimensional MPR representation 36. The animation shows movement of one or more of the planes represented in the three-dimensional MPR representation 36 relative to the other planes. The planes rotate and/or translate relative to each other. The three-dimensional MPR representation 36 as displayed over time shows the orientation and position of the planes of the MPR with the planes rotating, translating, or rotating and translating. The sequence of the three-dimensional MPR representations 36 represents a plurality of steps gradually or otherwise changing from the current arrangement to the final arrangement with a plurality of intermediary relative positions.

Rather than jumping from one arrangement to the next (e.g., initial to final), at least one intermediary three-dimensional MPR representation 36 is generated. The intermediary three-dimensional MPR representations 36 animate the transition from the current three-dimensional MPR representation 36 to another three-dimensional MPR representation 36. The three-dimensional image showing the MPR appears to gradually transition.

In one embodiment, the animation or gradual transition includes a plurality of intermediary three-dimensional MPR representations 36. Each of the intermediary three-dimensional MPR representations 36 and the initial and final three-dimensional MPR representations 36 correspond to different relative positions of the planes with respect to each other or a plane with respect to anatomy. The view of the planes are rotated and/or translated between the current arrangement and the selected arrangement. The initial, intermediary, and final three-dimensional MPR representations 36 are generated and displayed as a sequence. The sequence represents steps in the different arrangements gradually changing from the initial arrangement to the final arrangement.

Any step size, period of display of each representation, or time between three-dimensional MPR representations 36 may be used. In one embodiment, each of the intermediary three-dimensional MPR representations 36 is displayed for a short time such that one or more of the planes appear to continuously rotate and/or slide during the transition. For example, five or more three-dimensional MPR representations 36 with slightly different arrangements are displayed every second. By having relatively small step sizes in the relative rotation and/or translation, such as translating only one or a few pixels and/or rotating only a few degrees or less, the three-dimensional MPR representation 36 appears to smoothly change.

In one alternative embodiment, the animation has varied speed of transition or size of steps between arrangements. For example, the transition pauses on each three-dimensional MPR representation 36 for a while (e.g., 1-10 seconds) and then proceeds to the next. As another example, the transition more rapidly transitions at the beginning and/or middle of the animation than at the end.

In other embodiments, a jerky or non-smooth motion is provided. For example, a three-dimensional MPR representation 36 is initially displayed. Once the user selects a different arrangement, the three-dimensional MPR representation jumps without animation (e.g., without intermediary representations) to a reference arrangement. The transition from the reference arrangement to the selected arrangement is then animated.

Where the position of more than one plane changes between the arrangements, multiple planes are rotated and/or translated at a same time. The step size may adapt to the amount of change such that one plane appears to move more quickly than the other so both complete the transition at a same time. Alternatively, one plane may continue to change position after another completes the change. In other embodiments, the plane transitions are animated one at a time, such as rotating and translating a first plane, and then a second plane, and then a third plane. The rotation and translation of a given plane may occur at a same time or sequentially.

The animation is from a starting arrangement to another arrangement. The current positions transition to preset, standard, default, reference, or other positions. The individual three-dimensional MPR representation 36 is animated rotating and/or translating to the target orientations and positions from a starting orientation and position. The animation may be through a sequence of target orientations, such as animating the transition from a current arrangement, to a reference arrangement, and then to a selected (e.g., predetermined) arrangement.

Figures 3A, 3B, 3C, 3D:
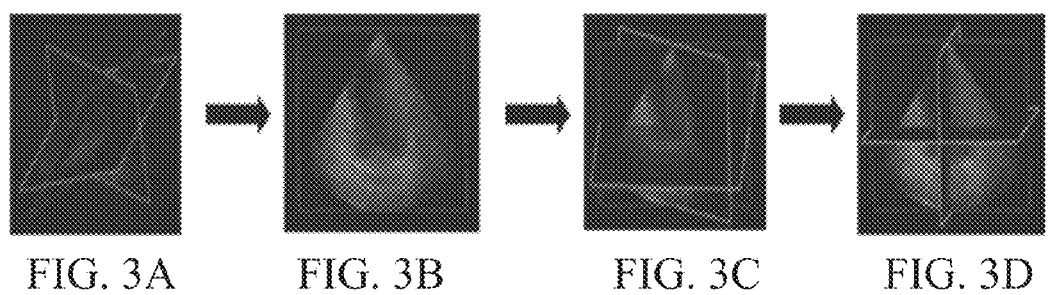
FIGS. 3A-D show example graphical representations of animation of a 3D MPR representation.

FIGS. 3A-D represent samples from an animated sequence of a three-dimensional MPR representation 36. FIG. 3A represents a starting or current arrangement of the MPR. The three-dimensional MPR representation 36 has three planes at non-orthogonal angles with respect to each other, but having a common center. The centers may be offset. Any angles may be provided. This MPR arrangement may be a standard, default, reference, user created or other arrangement. The user selects a reference or other arrangement. For example, the user selects the orthogonal arrangement shown in the three-dimensional MPR representation 36 of FIG. 3D as a default. In one embodiment, the planes shown in FIG. 3A are animated to directly transition to the arrangement of FIG. 3D. The arrangement of FIG. 3B is not used. Instead, the planes move the least amount possible or directly to animate the transition. FIG. 3C shows one intermediary three-dimensional MPR representation in the transition from the arrangement of FIG. 3A to the arrangement of FIG. 3D.

In other embodiments, the planes are animated to transition to a reference or other arrangement as an intermediary. For example, a pre-determined reference arrangement is used regardless of the current or final arrangement. FIG. 3B shows an example intermediary arrangement as a reference arrangement. The reference arrangement has all of the planes parallel to each other, such as appearing in a stack with or without space between the planes. The animation transitions the planes from the arrangement of FIG. 3A to the stack of FIG. 3B, such that the planes appear to rotate to be parallel. Any number of intermediary arrangements is shown. The animated transition from this reference arrangement then proceeds to the arrangement of FIG. 3D, with one or more intermediary arrangements shown (e.g., FIG. 3C). Any number of intermediary three-dimensional MPR representations 36 may be used. As compared to the parallel plane positions of the stack, the final three-dimensional MPR representation shows planes with non-parallel positioning, such as planes at angles between 45 and 135 degrees of each other.

Where the MPR images 32 and/or volume rendering 34 are included as part of the three-dimensional MPR representation 36, the MPR images 32 and/or volume rendering 34 change with or do not change with the animation. For example, FIGS. 3A-D show the volume rendering 36 fused with the three-dimensional MPR representation 36. In FIG. 3A, the volume rendering 34 is rendered with a viewing direction orthogonal to one of the planes. Accordingly, the fused volume rendering 34 is warped, adjusted, or rendered to account for the angle of the plane to the screen or viewer within the three-dimensional MPR representation. In FIGS. 3B, C, and D, the plane is shown as orthogonal to the viewer (parallel to the screen), so does not move and the viewing direction of the rendering is aligned with the viewing direction of the viewer. For the transition from FIG. 3B to FIG. 3D, the volume rendering 34 is the same. For the transition from FIG. 3A to FIG. 3B, the volume rendering is the same other than adjustment to account of the plane rotating or the volume rendering is performed each time with the viewing angle of the volume rendering changing with the change in plane orientation.

Where the MPR images 32 and/or volume rendering 34 are displayed on a same screen as separate images than the three-dimensional MPR representation 36 (see FIG. 2 for an example), the MPR images 32 and/or volume rendering 34 change or do not change with the animation. For example, the volume rendering 34 has a viewing direction orthogonal to the plane of the MPR image 32 on the top of the MPR images 32. As the plane is rotated relative to the volume and corresponding animation of the three-dimensional MPR representation 36 shows the change, the position of the plane relative to the volume represented by the data changes. The plane intersects different data, so a different MPR image 32 is displayed. Alternatively, the MPR image 32 is frozen during the animation or jumps to the final MPR image 32 prior to finishing the animation. The viewing direction and/or clipping plane for rendering the volume rendered image 34 may shift with the animation or may stay the same during the transition.

Throughout the animation, the three-dimensional MPR representation 36 is displayed. At the end of the transition, the final three-dimensional MPR representation 36 is displayed. "Final" is used to indicate the selected MPR arrangement to which the animation transitions for a given selection or trigger. Different three-dimensional MPR representations 36 for different arrangements may be later provided. The final three-dimensional MPR representation 36 is of the selected arrangement of the MPR. The final three-dimensional MPR representation 36 is displayed after the transition, such as being a last step in the animation.

The length of the persistence of the final three-dimensional MPR representation 36 is the same or different from the intermediaries. The final three-dimensional MPR representation 36 is displayed statically. The three-dimensional MPR representation 36 is maintained at the selected view until an indication of another arrangement is received, such as the user adjusting a plane location. In alternative embodiments, the final three-dimensional representation is non-static, such as being within an animation loop so that the final three-dimensional MPR representation 36 is displayed for a similar amount of time as intermediary views within the animation. The transition may be part of a loop, so that the three-dimensional MPR representation 36 stays in transition.

Figure 4:
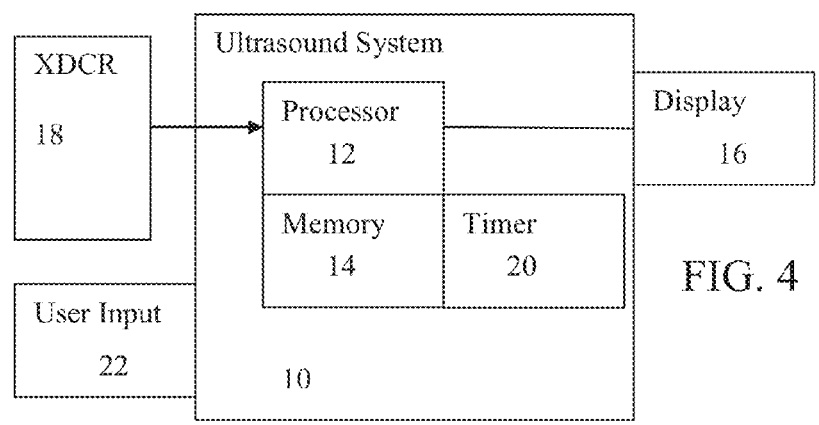
FIG. 4 is a block diagram of one embodiment of a medical imaging system for conveying spatial relationships in MPR imaging.

FIG. 4 shows a medical diagnostic imaging system 10 for conveying spatial relationships in multi-planar reconstruction. The system 10 is a medical diagnostic ultrasound imaging system, but may be a computer, workstation, database, server, or other imaging system. Other medical imaging systems may be used, such as a computed tomography or a magnetic resonance system.

The system 10 includes a processor 12, a memory 14, a display 16, a transducer 18, a timer 20, and a user input 22. Additional, different, or fewer components may be provided. For example, the system 10 includes a transmit beamformer, receive beamformer, B-mode detector, Doppler detector, harmonic response detector, contrast agent detector, scan converter, filter, combinations thereof, or other now known or later developed medical diagnostic ultrasound system components. As another example, the system 10 does not include the transducer 18. The timer 20 is shown as separate, but may be part of the processor 12.

The transducer 18 is a piezoelectric or capacitive device operable to convert between acoustic and electrical energy. The transducer 18 is an array of elements, such as a multi-dimensional or two-dimensional array. Alternatively, the transducer 18 is a wobbler for mechanical scanning in one dimension and electrical scanning in another dimension.

The system 10 uses the transducer 18 to scan a volume. Electrical and/or mechanical steering allows transmission and reception along different scan lines in the volume. Any scan pattern may be used. In one embodiment, the transmit beam is wide enough for reception along a plurality of scan lines, such as receiving a group of up to 20 or more receive lines for each transmission. In another embodiment, a plane, collimated or diverging transmit waveform is provided for reception along a plurality, large number, or all scan lines.

Ultrasound data representing a volume is provided in response to the scanning. The ultrasound data is beam-formed, detected, and/or scan converted. The ultrasound data may be in any format, such as polar or Cartesian coordinates, Cartesian coordinate with polar coordinate spacing between planes, or other format. In other embodiments, the ultrasound data is acquired by transfer, such as from a removable media or over a network. Other types of medical data representing a volume may also be acquired.

The memory 14 is a buffer, cache, RAM, removable media, hard drive, magnetic, optical, or other now known or later developed memory. The memory 14 may be a single device or group of two or more devices. The memory 14 is shown within the system 10, but may be outside or remote from other components of the system 10.

The memory 14 stores the ultrasound data. For example, the memory 14 stores flow components (e.g., velocity, energy or both) and/or B-mode ultrasound data. The medical image data is a three-dimensional data set, or a sequence of such sets. For example, a sequence of sets over a portion, one, or more heart cycles of the heart are stored. A plurality of sets may be provided, such as associated with imaging a same patient, organ or region from different angles or locations. The data represents a volume of a patient, such as representing a portion or all of the heart.

For real-time imaging, the ultrasound data bypasses the memory 14, is temporarily stored in the memory 14, or is loaded from the memory 14. Real-time imaging may allow delay of a fraction of seconds, or even seconds, between acquisition of data and imaging. For example, real-time imaging is provided by generating the images substantially simultaneously with the acquisition of the data by scanning. While scanning to acquire a next or subsequent set of data, images are generated for a previous set of data. The imaging occurs during the same imaging session used to acquire the data. The amount of delay between acquisition and imaging for real-time operation may vary, such as a greater delay for initially locating planes of a multi-planar reconstruction with less delay for subsequent imaging. In alternative embodiments, the ultrasound data is stored in the memory 14 from a previous imaging session and used for imaging without concurrent acquisition.

The memory 14 is additionally or alternatively a computer readable storage medium with processing instructions. The memory 14 stores data representing instructions executable by the programmed processor 12 for conveying spatial relationships in multi-planar reconstruction. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, digital signal processor, three-dimensional data processor, graphics processing unit, application specific integrated circuit, field programmable gate array, digital circuit, analog circuit, combinations thereof, or other now known or later developed device for processing medical image data. The processor 12 is a single device, a plurality of devices, or a network. For more than one device, parallel or sequential division of processing may be used. Different devices making up the processor 12 may perform different functions, such as a scanning controller and an image generator operating separately. In one embodiment, the processor 12 is a control processor or other processor of a medical diagnostic imaging system, such as a medical diagnostic ultrasound imaging system processor. In another embodiment, the processor 12 is a processor of an imaging review workstation or PACS system. In yet another embodiment, the processor 12 is a volume rendering processor. The processor 12 operates pursuant to stored instructions to perform various acts described herein, such as obtaining data, generating three-dimensional MPR representations (i.e., an image showing the spatial relationship of one or more MPR planes), animating transition between different MPR arrangements, and/or controlling imaging.

In one example embodiment, the processor 12 generates multi-planar reconstructions and a volume rendering of the volume data, such as of the heart. Three or other number of MPR (multi planar reconstruction) images are generated. A fourth window or portion of the display is used for a three-dimensional representation of the volume. The three-dimensional representation may be rendered for any desired view, such as a view corresponding to placing a clip plane at the location of one of the MPRs. The viewing direction for the volume rendering is orthogonal to or slightly offset to orthogonal (e.g., 5-10 degrees) to the clip plane placed at the location of the MPR in the volume data. The clip plane is used as a clipping plane with the representation rendered from data behind the clip plane from the users view point. MPR may be provided without the volume rendering.

The processor 12 generates a three-dimensional MPR representation for display. The three-dimensional MPR representation includes indicators of the one or more planes of the MPR in a same image or adjacent to each other for reference. The planes are shown simultaneously to indicate the relative position of the planes to each other. The MPR images show the anatomy at the planes. The volume rendering shows a three-dimensional view of the anatomy. The three-dimensional MPR representation shows the MPR or relative planar positions with or without also showing anatomy information.

In response to a trigger, the processor 12 causes the three-dimensional MPR representation to shift. One or more planes within the representation appear to move. The shift in plane position is performed as an animated rotation and/or translation from one relative arrangement of MPR planes to another. A sequence of transitions is formed to gradually shift the arrangement from a current positioning to another positioning.

For the animation, initial, final, and a sequence of representations in between each have different relative plane positions. To show rotation, one or more planes are incremented about one or more axes. Any size rotation increment and any amount of time between successive steps in rotation may be used. For example, the displayed three-dimensional MPR representation is created at the display rate of the monitor, e.g. ~60 Hz. Depending on the rate of change of animated MPR, the three-dimensional MPR representation may be changed at a rate up to the display rate.

The timer 20 is a clock, processor, counter, or other circuit for differentiating time segments. In one embodiment, the timer 20 is the processor 12. The timer 20 is programmable or may operate using fixed periods. The processor 12 uses the timer 20 to provide the animation. In response to a count, absolute time, time threshold, clock cycle, or other timing information of the timer 20, the processor 12 causes the next three-dimensional MPR representation in the animation sequence to be displayed.

The timer 20 causes the processor 12 to statically or initially display an initial three-dimensional MPR representation. The three-dimensional MPR representation represents the location of the MPR planes relative to each other and/or anatomy of the patient. Any period of static display may be used, such as until the user indicates a transition. Similarly, the timer 20 causes the processor 12 to statically display the final three-dimensional MPR representation for any period. "Final" is used to reflect the view to which the rendering is transitioned. The final view may be an initial view for another animation or transition. The animation may or may not start from the initial view and may or may not end at the initial view. No, one, or more jumps noticeable to the user may be provided.

For animation, the timer 20 causes the processor 12 to generate a sequence of three-dimensional MPR representations for display. The sequence represents plane positions between the initial and final three-dimensional MPR representations. Based on the timer 20, each of the three-dimensional MPR representations of the sequence is displayed for a time less than the static displays of the initial and/or final views. For example, the timer 20 indicates if another step in the animation is to occur. This causes the processor 12 to generate the appropriate three-dimensional MPR representation of wire frames of the MPR planes with one or more MPR planes slightly offset from a currently or previously displayed three-dimensional MPR representation. The time between three-dimensional representations in the animation may be a fraction of a second, such as $1/10^{th}$ of a second or less.

The timer 20 controls, in part, the rate of change when transitioning from one arrangement of planes to another. The step size of the transition may also affect the rate of transition. The timer 20 controls the speed of the rotation and/or translation. This timing allows the animation to appear to rotate (e.g., about x, y, and/or z axes) and translate (e.g., along x, y, and/or z axes) in real-time to the user. The spatial transition between arrangements is shown. The speed is slow enough to allow the user to comprehend the change and quickly interpret the new locations of the planes. Longer periods may be provided. For example, a total time for the animation from the initial arrangement to the final arrangement of a given transition is set. The rate of change is controlled by selecting one of several functions (i.e., the rate of change of the viewing direction may be constant, linear, or some non-linear function).

The display 16 is a CRT, LCD, plasma, monitor, projector, printer, or other now known or later developed display device. The display 16 displays the initial three-dimensional MPR representation, the sequence of three-dimensional MPR representations, and the final three-dimensional MPR representation. Images, such as three-dimensional MPR representations, are displayed by themselves or in combination with MPR displays or images. Multiple images may be displayed in different portions of a screen of the display 16, such as in different windows.

The user input 22 is a button, slider, knob, keyboard, mouse, trackball, touch screen, touch pad, combinations thereof, or other now known or later developed user input devices. The user may operate the user input 22 to program the timer 20, set rendering values (e.g., define a clip plane, select a type of rendering, set an offset angle, or set the step size or speed for animation), select MPR plane arrangements, alter a position of one or more planes, or operate the system 10. The processor 12 transitions an animation from the initial three-dimensional MPR representation, through the sequence of three-dimensional MPR representations, and to the final three-dimensional MPR representation in response to user activation of the user input 22. For example, the user selects a default, reference, standard, predetermined or other arrangement from a menu, group of icons or other list. Alternatively, a single button or selection is provided on the user interface to transition to a default, predetermined, standard, user programmed, or other arrangement. In response to the user input, the processor 12 transitions through animation to the indicated arrangement. A single input may be used to cause transition (e.g., selection of an icon) or a plurality of inputs may be used (e.g., translating or otherwise defining the animation or plane positions). The inputs are not for dragging or manually moving the MPR planes. Rather than user selection of a predetermined arrangement, the animation and transition may occur in response to a processor generated trigger.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for conveying spatial relationships in multi-planar reconstruction, the method comprising:

displaying a three-dimensional representation of a first relative positioning of planes of the multi-planar reconstruction of a volume, the three-dimensional representation comprising graphics of the planes of the multi-planar reconstruction, the graphics overlaid with each other and displayed spaced from images of the multi-planar reconstruction and the graphics spaced from a volume rendering of the volume;

receiving a trigger to transition from the first relative positioning to a second relative positioning of the planes of the multi-planar reconstruction; and animating the transition in the displayed three-dimensional representation such that the planes are shown in intermediary relative positioning during the animation, the intermediary relative positioning different than the first and second relative positioning of the planes of the multi-planar reconstruction.

2. The method of claim 1 wherein displaying comprises simultaneously displaying planar images as the images of the multi-planar reconstruction extracted from the volume, the volume rendering of the volume, and the three-dimensional representation.

3. The method of claim 1 wherein displaying comprises displaying first and second frames corresponding to the planes relatively oriented with a face of the first frame occluding a portion of a face of the second frame and with the face of the second frame occluding a portion of the face of the first frame.

4. The method of claim 3 wherein displaying the first and second frames comprises displaying the first and second frames as images of the multi-planar reconstruction.

5. The method of claim 1 wherein displaying comprises displaying the three-dimensional representation fused with another volume rendering.

6. The method of claim 1 wherein the first relative positioning comprises a user created positioning and the second relative positioning comprises a standard positioning, and wherein receiving the trigger comprises receiving an indication to transition from the user created positioning to the standard positioning.

7. The method of claim 1 wherein the first relative positioning comprises a current positioning and the second relative positioning comprises a default positioning, and wherein receiving the trigger comprises receiving an indication to transition from the current positioning to the default positioning.

8. The method of claim 1 wherein the trigger is a single user input of selection of the second relative positioning from a list and without user manipulation of plane locations of the first relative positioning.

9. The method of claim 1 wherein animating comprises displaying the three-dimensional representation in a sequence, the sequence representing a plurality of steps gradually changing from the first relative position to the second relative position with a plurality of intermediary relative positions, including the intermediary relative position, each of the intermediary relative positions being displayed for a short time such that the three-dimensional representation appears to have the planes translate, rotate, or translate and rotate relative to each other.

10. The method of claim 1 wherein animating comprises displaying the planes rotating, translating, or rotating and translating relative to each other.

11. The method of claim 10 wherein animating comprises showing the planes rotating, translating, or rotating and translating from the first relative positioning to a stacked position and then rotating, translating, or rotating and translating from the stacked position to the second relative positioning.

12. A system for conveying spatial relationships in multi-planar reconstruction, the system comprising:

a memory operable to store data representing a volume of a patient;

a processor configured to generate the multi-planar reconstruction from data, the multi-planar reconstruction including a first planar image of a first plane through the volume;

a timer configured to cause a first display of wire frames representing a reference and the first plane overlapping in a first relative orientation and first relative translation with the reference, a second display of the wire frames representing the first plane in a second relative orientation and second relative translation with the reference, and a sequence of third displays of the wire frames representing the first plane overlapping, with the reference, in relative orientations and relative translations between the first and second relative orientations and relative translations where a face of the first plane occludes the reference and a face of the reference occludes the first plane in at least one of the relative orientations and relative translations in one of the first, second or third displays; and a display configured to display the first, second, and third displays.

13. The system of claim 12 wherein the first display comprises the first plane and a second plane stacked with a same orientation, and the second display comprises the first plane at an angle between 45 degrees and 135 degrees to the second plane.

14. The system of claim 12 wherein the first relative orientation and first relative translation comprise user adjusted positions, and wherein the second relative orientation and second relative translation comprise predetermined positions.

15. The system of claim 12 wherein the first, second and third displays comprise the wire frames for the first plane and a second plane, the reference comprising the second plane.

16. The system of claim 15 wherein the first, second, and third displays comprise a volume rendering of the volume fused with the first plane.

17. The system of claim 15 wherein the display is configured to display the multi-planar reconstruction with the first, second, and third displays.

18. In a non-transitory computer readable storage medium having stored therein data representing instructions executable by a programmed processor for conveying spatial relationships in multi-planar reconstruction, the storage medium comprising instructions for:

receiving user input indicating a change of position of three planes in the multi-planar reconstruction; and animating the change as a sequence of three-dimensional representations showing the orientation and position of the three planes of the multi-planar reconstruction with the three planes rotating, translating, or rotating and translating relative to each other over the sequence of the three-dimensional representations.

19. The non-transitory computer readable storage medium of claim 18 wherein receiving comprises receiving user selection of a pre-determined arrangement of the planes within a volume, and wherein animating comprises animating from a currently displayed arrangement to the pre-determined arrangement.

20. The non-transitory computer readable storage medium of claim 18 wherein animating comprises animating with the sequence displayed with the multi-planar reconstruction images and a volume rendered image.

* * * * *